United States Patent
Nishikubo et al.

[19]

[11] Patent Number: 5,867,613
[45] Date of Patent: Feb. 2, 1999

[54] HIGH SPEED HARDWARE LOADER FOR LOOK-UP TABLE

[75] Inventors: Sam S. Nishikubo, Gardena; Jon J. Nagareda, Palo Alto, both of Calif.

[73] Assignee: Raytheon Company, El Segundo, Calif.

[21] Appl. No.: 604,042

[22] Filed: Feb. 20, 1996

Related U.S. Application Data

[60] Provisional application No. 60/004,539 Sep. 29, 1995.

[51] Int. Cl.$^6$ .................................................. G06K 9/00
[52] U.S. Cl. .................................... 382/305; 382/232
[58] Field of Search .................. 382/101, 105, 382/107, 135, 137, 138, 168, 169, 170, 171, 172, 173, 175, 180, 181, 190, 192, 209, 217, 224, 232, 235, 238, 239, 240, 243, 244, 248, 251, 270, 312, 305; 358/426, 470, 261.3; 348/715; 250/330

[56] References Cited

U.S. PATENT DOCUMENTS

| | | | |
|---|---|---|---|
| 4,485,402 | 11/1984 | Searby | 358/160 |
| 4,858,017 | 8/1989 | Torbey | 358/426 |
| 4,868,670 | 9/1989 | Morton et al. | 358/447 |
| 5,179,528 | 1/1993 | Robertson et al. | 364/715.02 |
| 5,249,241 | 9/1993 | Silverman et al. | 382/51 |

FOREIGN PATENT DOCUMENTS 61-62003 9/1987 Japan .............................. G01S 3/78

OTHER PUBLICATIONS

A. J. McCollum et al., "A Histogram Modification Unit for Real–Time Image Enhancement"; Computer Vision, Graphics, and Image Processing, vol. 42, No. 1, 1 Apr. 1988, pp. 391–398.

*Primary Examiner*—Leo H. Boudreau
*Assistant Examiner*—Bijan Tadayon
*Attorney, Agent, or Firm*—Colin M. Raufer; Leonard A. Alkov; Glenn H. Lenzen, Jr.

[57] ABSTRACT

A data compression system for use in thermal imaging systems. The data compression system includes a memory (74) for receiving an input video signal. Hardware loader (100) loads the video signal into the memory (74). A system processor (84) controls loading of the input video signal by the hardware loader (100) into the memory (74). A histogram chip (80) determines useful data contained in the video signal input into the memory (74). The processor (84) reads information from the histogram chip (80) and compresses the video signal as a function of information read from the histogram chip.

10 Claims, 7 Drawing Sheets

HIGH SPEED HARDWARE LOADER FOR LOOK-UP TABLE

This aplication is based upon provisional application Ser. No. 60/004,539 filed Sep. 29, 1995, the priority of which is hereby claimed.

BACKGROUND OF THE INVENTION

1. Technical Field

The present invention relates generally to thermal imaging systems, and in particular to a high speed hardware implemented loader for loading video signal data to a look-up table for video signal data compression without having to first load the data into the system processor, thereby freeing the processor for other functions and speeding up processing of the subject video signal data.

2. Discussion

Scanning thermal imaging systems are used in a variety of applications, including surveillance systems and target detection/recognition systems. Such systems typically incorporate a telescopic lens assembly coupled to a scanner. The scanner scans energy from a scene through an imager lens assembly onto a detector array having a plurality of photoelectrically responsive detector elements perpendicular to the scan direction. Each of these detector elements provides an electric signal proportional to the flux of infrared light on the particular detector element. Electric signals generated from the detector elements are subsequently processed by system sensor electronics to create an image that is displayed on a system output device. To improve sensitivity, some of these systems incorporate detectors parallel to the scan direction. The output of these detectors are delayed in time from each other such that, ideally, the scanned image is output simultaneously on all of the parallel detectors. The delayed outputs are then summed (integrated). This process is referred to as time delay and integrate (TDI).

In the above-mentioned thermal imaging systems, the system electronics must typically compress an input video signal from 15 bits typically down to as few as 8 bits for further video signal processing or display. This data compression is conventionally done directly through the system processor. The processor loads video signal data directly into a static RAM memory on an address by address basis. Subsequent to the processor reading data accumulated by means such as a histogram chip, the video data is compressed by the processor through a video compression function loaded into a look-up table. The processor programs the look-up table with video compression mapping data.

In conventional thermal imaging systems, the above-mentioned data compression approach was inherently slow, as the video signal data was loaded directly by the processor into the look-up table on an address by address basis. The data compression function, when combined with other competing demands on the processor, subsequently caused inherent loop delays and thus slowed overall system processing.

Thus, what is needed is a data compression system for a thermal imaging unit that bypasses the system processor in large part, thereby freeing up the system processor for other functions and thus speeding up data compression and overall system speed.

SUMMARY OF THE INVENTION

In accordance with the teachings of the present invention, a hardware-implemented high speed loader is provided for use in thermal imaging systems to load video compression data directly to a look-up table. The high speed hardware loader of the present invention bypasses loading of the data by the processor, thereby freeing up the processor for other applications and speeding up the data compression process.

In particular, the present invention provides a data compression system for use in a thermal imaging system. The system includes a memory for receiving input video signal data. Hardware loading means loads the video compression data into the memory. A system processor controls loading of the input video compression data by the hardware loading means into the memory. A histogram chip is used to determine the compression data to load into the memory. The processor calculates the compression data based on the information read from the histogram chip.

BRIEF DESCRIPTION OF THE DRAWINGS

Other objects and advantages of the invention will become apparent upon reading the following detailed description and upon reference to the drawings, in which.

DETAILED DESCRIPTION OF THE PREFERRED EMBODIMENT

The following description of the preferred embodiments is merely exemplary in nature and is in no way intended to limit the invention or its application or uses.

Figure 1:
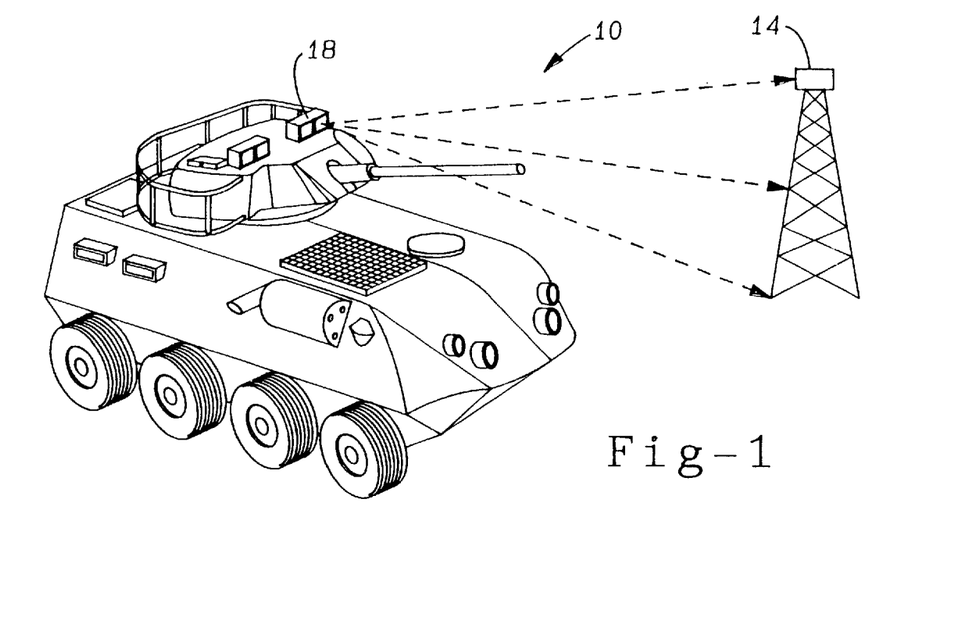
FIG. 1 illustrates an LAV-25 light armored vehicle in which the present invention may be implemented.
Figure 2:
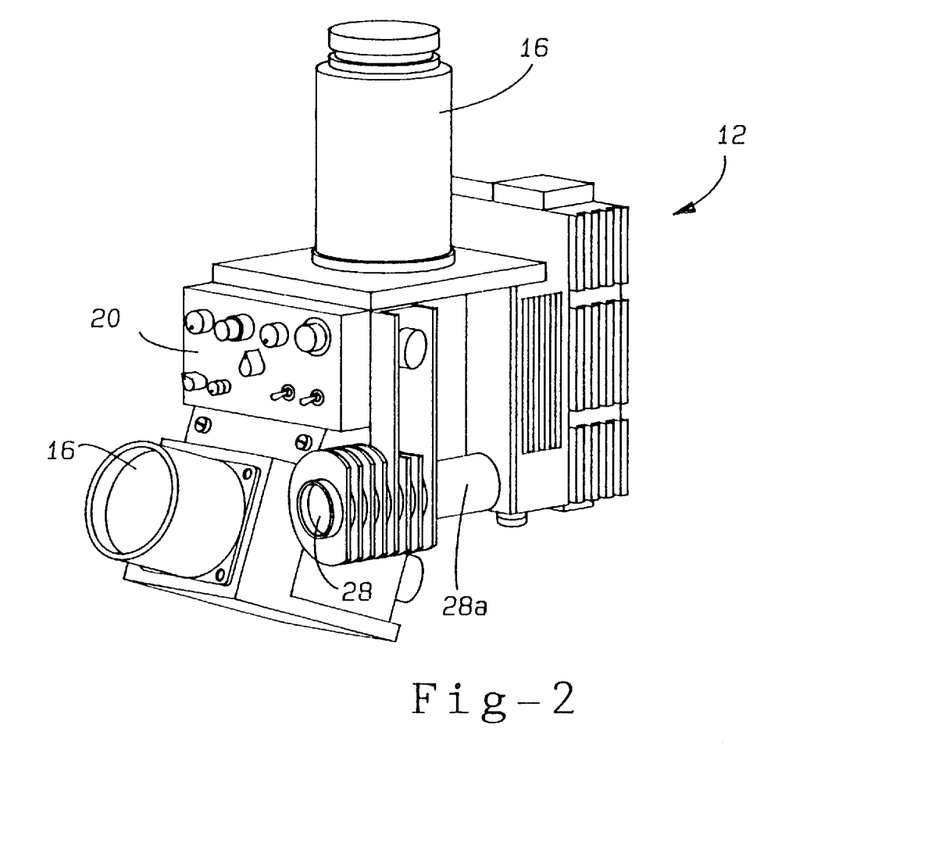
FIG. 2 is a perspective view of a thermal imaging system unit in which the preferred embodiment of the present invention is implemented.

Referring to the drawings, FIG. 1 shows an LAV-25 light armored vehicle 10 in which the preferred embodiment of the present invention is implemented. As shown in FIGS. 1 and 2, the present invention is implemented as part of a thermal imaging unit 12, which processes energy reflected from a detected target scene 14 back through a system telescope assembly 16 coupled to an externally mounted head mirror 18.

Preferably, the thermal imaging unit 12 is a Hughes Infrared Equipment (HIRE) thermal imaging sensor unit. The HIRE unit is a high performance light weight modular fire control sight and thermal imaging system that is capable of providing superior vision capability through total darkness, smoke, dust, and other types of adverse conditions. The HIRE system may be implemented in a wide variety of environments, including in a variety of armored vehicles, such as the LAV-25, Piranha, Desert Warrior, and LAV-105. The thermal imaging unit 10 provides stand alone thermal imaging capability, but can also be configured for use with TOW missile fire control systems. The unit incorporates several commercially available major components, thereby reducing logistics requirements through commonality of such things as repair facilities, support equipment, training programs and spare parts. The EFL compensator of the present invention enables the thermal imaging sensor unit to provide a significant improvement in imaging unit image quality and range performance over conventional thermal imaging systems as will now be described.

Referring to FIGS. 1–5, the telescope assembly 16, through which target searching and sighting functions are achieved, is implemented in a protected environment within the vehicle 10. Preferably, the telescope assembly 16 may be selectively switched to either a narrow field of view or a wide field of view as desired through switches on the gunner and commander control panels 20, 22. The head mirrors 18 are implemented to relay a detected scene to the telescope assembly 16. Subsequent to target scene thermal energy signal being processed by the thermal imaging unit, as will be described below, the scene is viewed through a gunner display 19 operatively coupled to a display control panel 20 and a commander display 21 coupled to a commander display control panel 22.

Figure 3:
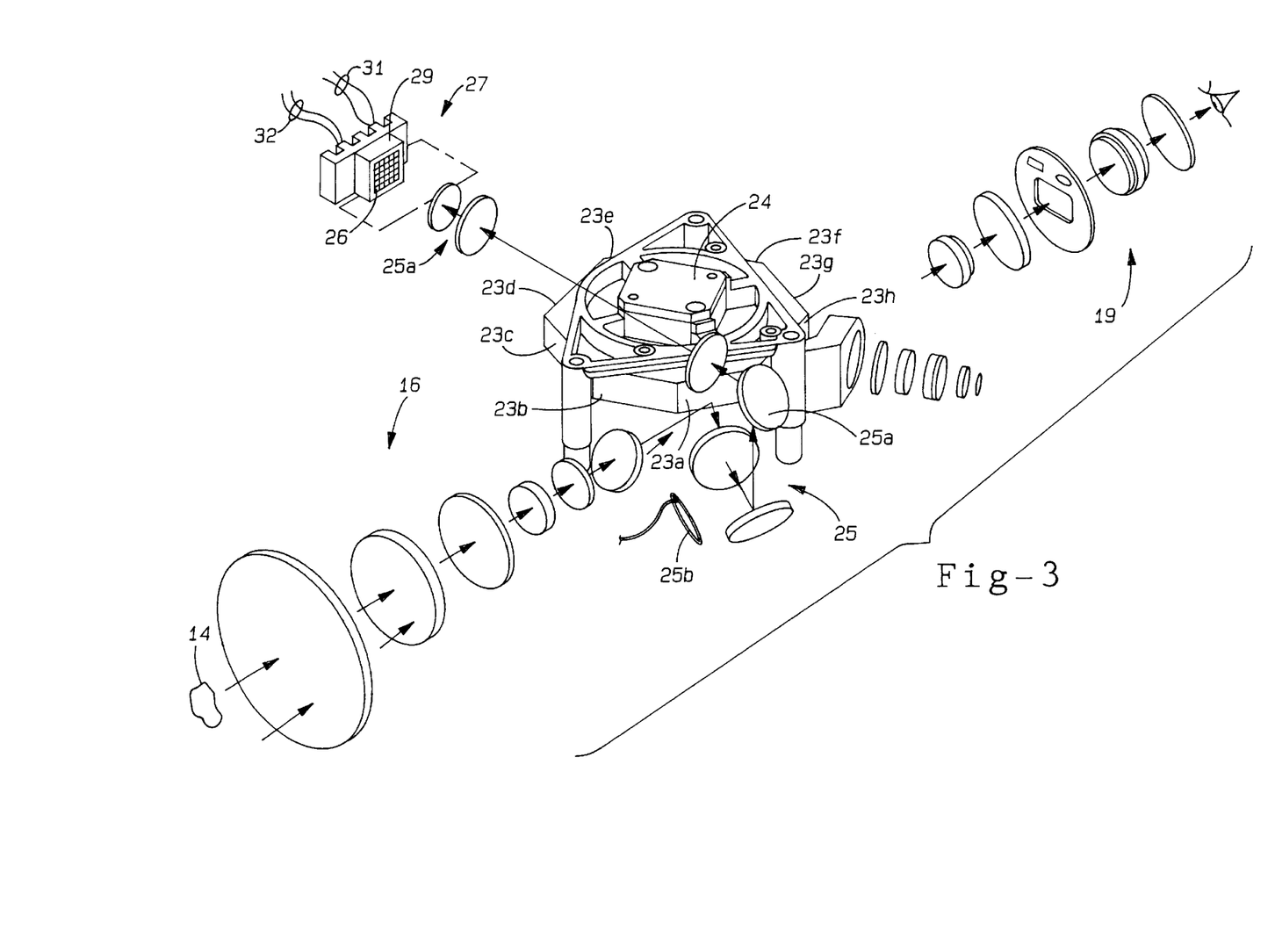
FIG. 3 is a partial exploded view of the thermal imaging optical and detector system shown in FIG. 2.

As shown in FIG. 3, energy from the detected scene is transmitted through the thermal imaging unit 12 to a polygonal, mirrored scanner 23 rotated by a scanner motor 24. The scanner includes 8 facets 23a–23h, each of which is cut at an angle to effect displacement of the scanned scene energy on the detector array by a discrete amount. The cut and displacement effected by each facet is shown below:

TABLE I

| FACET | CUT | DETECTOR ARRAY ENERGY DISPLACEMENT (IN PIXELS) |
|---|---|---|
| 23a | Normal | 0 |
| 23b | Interlaced | –½ |
| 23c | Up | +1 |
| 23d | Interlaced | –½ |
| 23e | Down | –1 |
| 23f | Interlaced | –½ |
| 23g | Normal | 0 |
| 23h | Interlaced | –½ |

As the scanner rotates, the scanner mirrors reflect the scene energy at successively varying angles through an imager assembly shown generally at 25. The imager assembly includes imager lenses, such as lens 25a, which image the scene onto a detector array 26 housed within a detector assembly 27. The imager assembly 25 also includes an imager optics temperature sensor 25b for monitoring the temperature of the imager. The detector assembly 27 is housed within a dewar 28 and cooled by a cooler 28a to cryogenic temperatures. A cold shield 29 housed within the dewar 28 limits the thermal energy that can be seen by the detector such that the detector elements only detect scene energy input through the telescope assembly optics and not other peripheral forms of energy input into the system, such as energy from the warm sides of the housing. The cold shield thereby reduces input noise and thereby improves overall system image quality.

Figure 4:
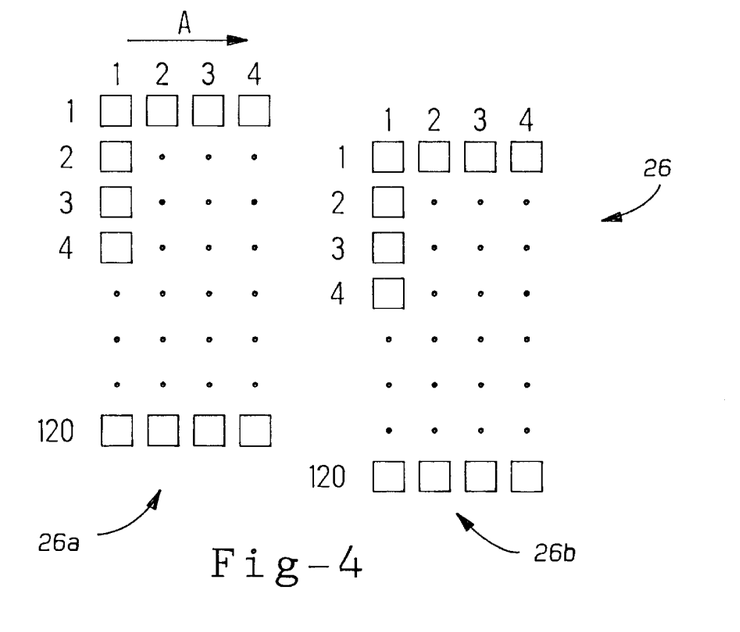
FIG. 4 illustrates the arrangement of the detector assembly elements shown partially in FIG. 3.

As shown partially in FIG. 3 and more fully in FIG. 4, the detector array 26 of the present invention consists of two staggered 120×4 subarrays 26a, 26b of detector elements, with each element being sensitive to light in the infrared spectrum and each having a detector element output. The scanner scans the image of the scene across the detector in the direction indicated by the arrow A shown in FIG. 4. The output of each detector element is input to a readout integrated circuit (ROIC) 27a (FIG. 5) associated with the detector assembly which samples the output, provides the time delay and integration (TDI) of the four parallel detector elements in each detector element row, and multiplexes the 240 resulting TDI detector channels into 4 video output channels 31, 32, with output channels 31 carrying output signals from the first 120×4 detector subarray 26a, and output channels 32 carrying output signals from the second detector subarray 26b. The ROIC includes a TDI clock 27b that determines when the detector outputs are sampled at the TDI, a multiplexer 27c, and a higher speed detector clock 27d for the ROIC multiplexer, which preferably has a minimum 60:1 sample period.

In the preferred embodiment, the 4 multiplexed output channels of the detective assembly are further multiplexed into one channel by the signal processing electronics at an input high speed clock (HCLK) rate which preferably has a minimum 240:1 sample period and is associated with system electronics described below in reference to FIG. 6. An EFL compensator varies the sample rate of the DCLK 27d to control the sample rate of the TDI clock 27b.

Presently implemented detector arrays typically feature 60 to 120 detector elements, with each having an associated output wire. Thus, the detector array of the present invention exhibits higher resolution due to the additional detector elements. Further, the detector array of the present invention utilizes multiplexed detector array output lines, thereby minimizing detector element output wires and thus minimizing area required to implement the array and facilitating ease of assembly and repair.

Figure 5:
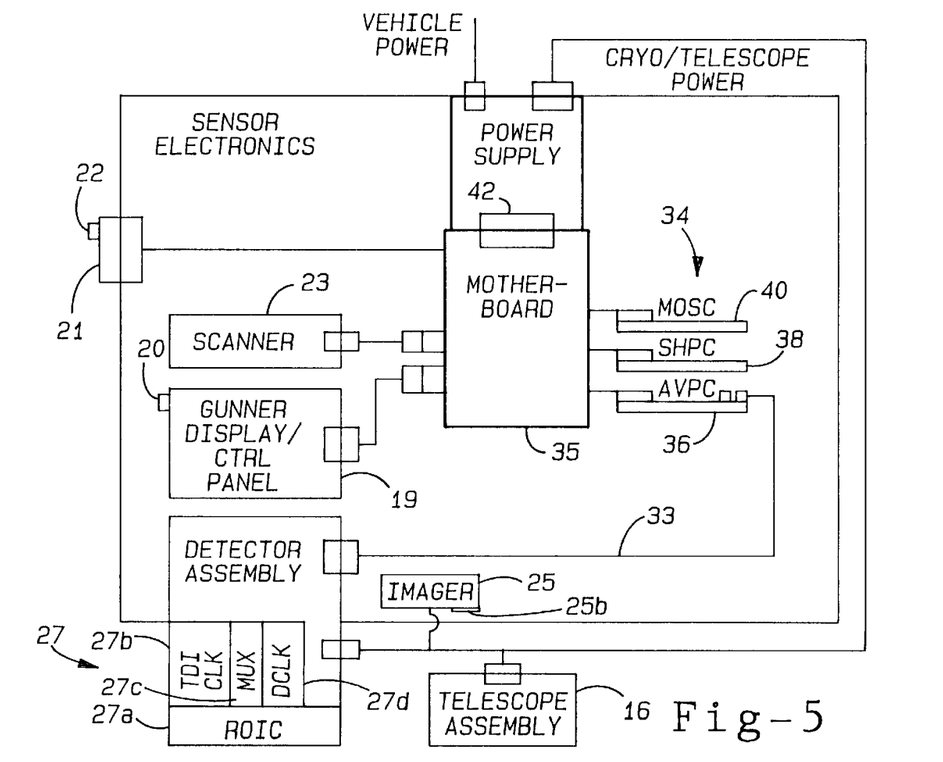
FIG. 5 is a block diagram of the thermal imaging system unit shown in FIG. 2.

Referring now to FIG. 5, operation of the imaging system components is controlled generally by the system electronics 34. The system electronics 34 are implemented on three cards coupled to a system mother board 35. The cards include an analog video processing card (AVPC) 36, a scene based histogram processor card (SHPC) 38 and a memory output symbology card (MOSC) 40. The associated functions of each of these cards will be discussed in greater detail below. Also coupled to the mother board 35 is a power supply card 42 that receives power input from the vehicle in which the system is implemented and outputs power to various system components at voltage levels required by the individual system components.

Figure 6:
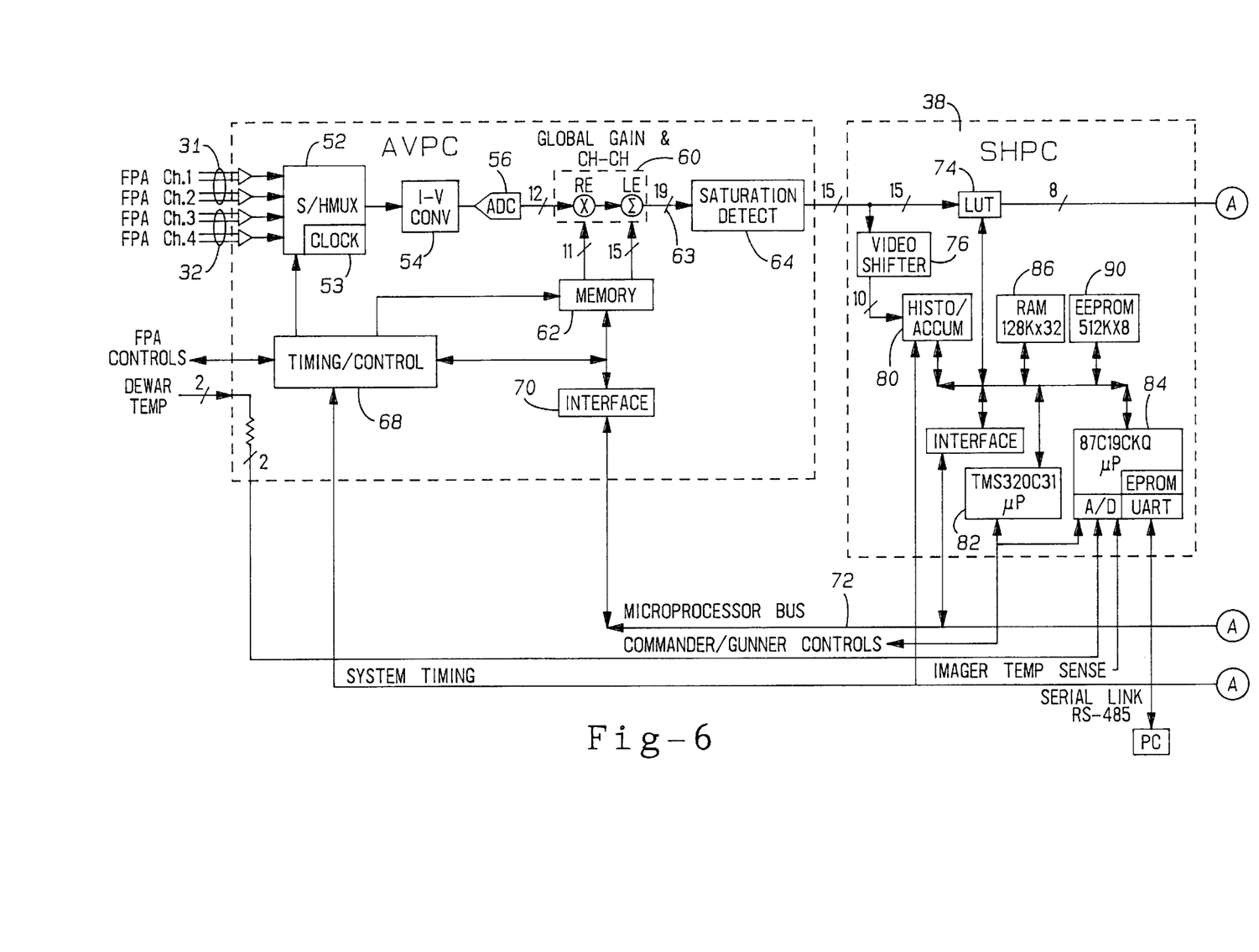
FIGS. 6–6A are block schematic diagrams of system electronics of the thermal imaging system of the present invention.
Figure 6A:
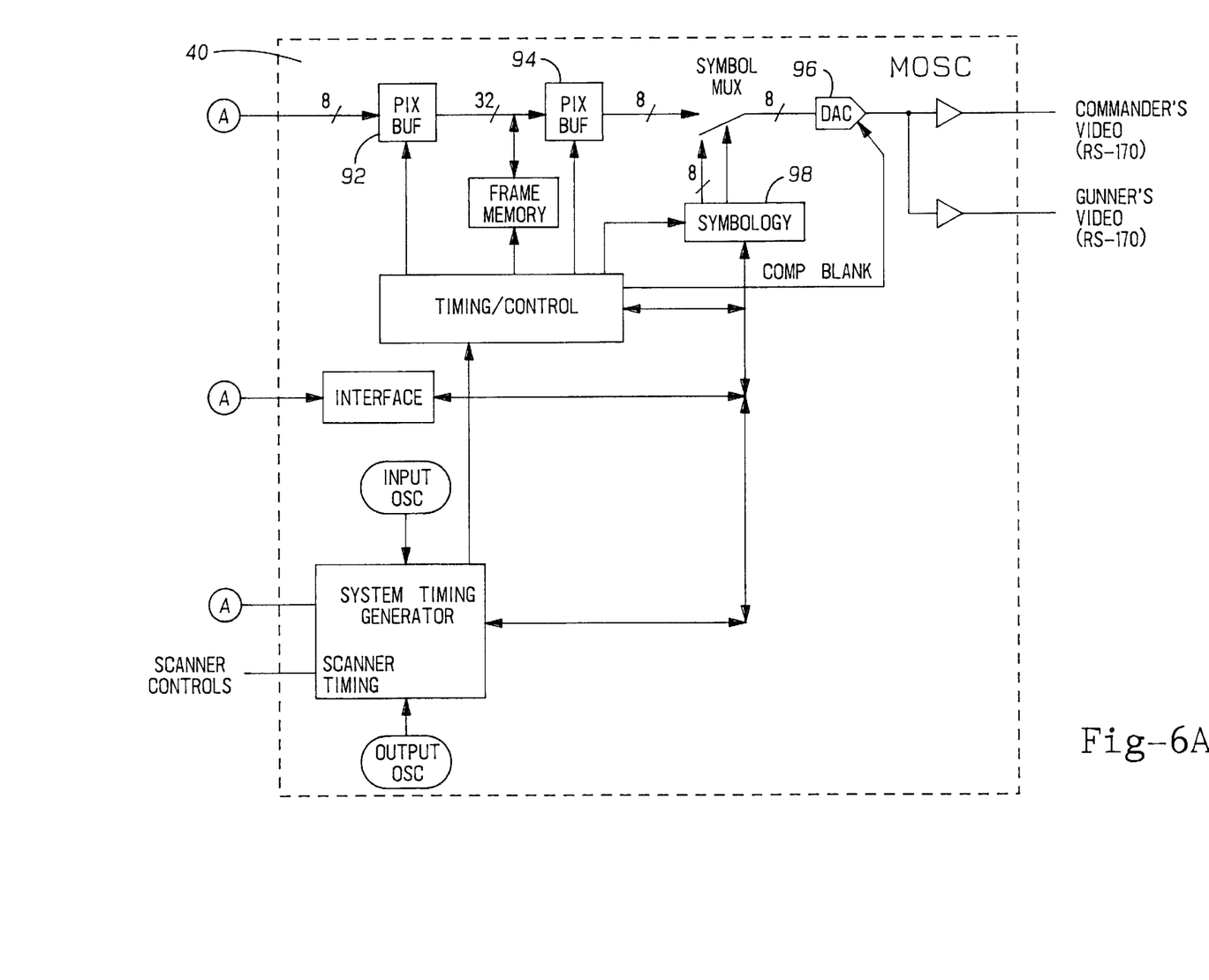

Referring now in detail to FIG. 6, an overall block diagram showing the components implemented on the three cards 36, 38 and 40 is shown. Referring first to the AVPC card 36, channel outputs 31, 32 are input into an S/HMUX 52 having an associated high speed system multiplier clock (HCLK) 53. Preferably, all 960 detector elements (240 pixels) are clocked during the clock sample period. The S/HMUX 52 is preferably a HUGHES custom integrated circuit, Part No. 6364060PGA-DEV, designed to sample and further multiplex the multiplexed detector element outputs. These multiplexed signals are sampled at an adjustable sample rate. However, for further signal processing, the signals are converted to voltage signals through I–V converter 54. Once these signals are converted, the signals are digitized by an analog to digital converter 56.

After being converted into digital signals, the detector element output signals are input into a signal equalizer 60. The signal equalizer 60 adds an associated gain and level value, stored in a memory 62, for each one of the 240 detector pixel elements to correct any gain and level differences from each of the detector pixel signals so that the multiplexed digital signal output at 63 is uniform, thereby enhancing picture quality.

Still referring to the AVPC card 36, the digitized input signal (to the signal equalizer 60) is 12 bits. However, the signal equalizer, in correcting signal gain and level differences, subsequently increases the digital signal output to 19 significant bits. As the signal contains only 15 bits of usable data, saturation detector 64 sets all data above the 15 bit range to a saturation level of 32767 and all data below the 15 bit range to 0. Therefore, only the useful data within the 15 bit range is output to the SHPC card 38. The AVPC card also includes a timing/control processing unit 68 implementing the clocks 53 and line timing for clocking multiplexed signals from the S/HMUX during a sample period. Preferably, the line timing HCLK has a clock sample rate of 240 TDI channels per sample period plus 16 clocks dead time. However, this rate may be varied by the present invention as necessary as will be described below. The AVPC card also includes an interface 70 that connects AVPC card components to a system microprocessor bus 72.

Turning now to the SHPC card 38, the signal output from the saturation detector 64 is input into a look-up table 74. Generally, the output dynamic range of the digitizing and signal equalizing process is greater than the maximum dynamic range of traditional image displays. Moreover, there are areas of the output dynamic range that have minimal or no information. Therefore, the output signal of the digitizing and signal equalizing process is input into a look-up table 74 to compress the information into display dynamic range. The look-up table provides a programmable method of mapping the larger input dynamic range into the smaller output dynamic range The mapping can be varied continuously either based on manual input from a system operator or based on an automatic histogram-based method. Prior to the look-up table, the video is input to a histogram/accumulator 80. The histogram/accumulator 80 performs certain programmable functions, such as line summing, line grabbing, and histogramming of the digitized information. The look-up table 74 converts the 15 bit signal output from the saturation detector to an 8 bit output signal. The look-up table is preferably a 32 k×8 Random Access Memory (RAM) well known in the art such as Integrated Device Technology Model No. IDT71256, and can be varied continuously either based on manual input from a system operator or based on an automatic gain algorithm. The 15 bit signal output from the saturation detector is also converted to a 10 byte signal through a video shifter 76.

Also located on the SHPC card 38 are microprocessors 82 and 84. As discussed above, many functions are under microprocessor control. The microprocessor 84 performs numerous control-related operations associated with the control panel(s), controls the TDI clock rate for EFL compensation and histogram/accumulator function, and calculates the level equalization value for each pixel, the global level control value, and the look-up table values. The microprocessor 82 performs more system-based processing related functions and is operatively associated with a RAM 86 and an EEPROM 90. Both the RAM 86 and the EEPROM 90 store the software based commands controlling the electronic effective focal length compensator according to the preferred embodiment of the present invention, the function of which will be described in greater detail below.

Referring now to the MOSC card 40, the 8 bit output signal from the look-up table 74 is input through pixel buffers 92, 94 and output to both the gunner display 19 and the commander display 21 after being scan-converted via a frame memory and converted back to an analog signal through the digital to analog converter 96. Symbology may also be switched in for any pixel in the image signal by symbology processor 98 before being output through the digital analog converter 96. Such symbology data may include status indications, sighting cross hairs and instructional text at the bottom of either the commander or the gunner display.

Prior to being output to the display, the digitized signal is scan converted. Generally, the scanner scans the scene horizontally; thus, the data is multiplexed along vertical columns. Standard video displays, however, require the data to be output along horizontal lines. Therefore, the digitized data must be converted from the vertical column input format to a horizontal line output format. Moreover, because of the separation between the detector subarrays, the digitized data from the subarrays are delayed in time from each other. This delay must be removed. The delay is dependent of the imager's effective focal length and, because the data is digitized, correct removal of the delays depends upon correct compensation for the image focal length changes. An EFL compensator provides both of these functions.

Figure 7A:
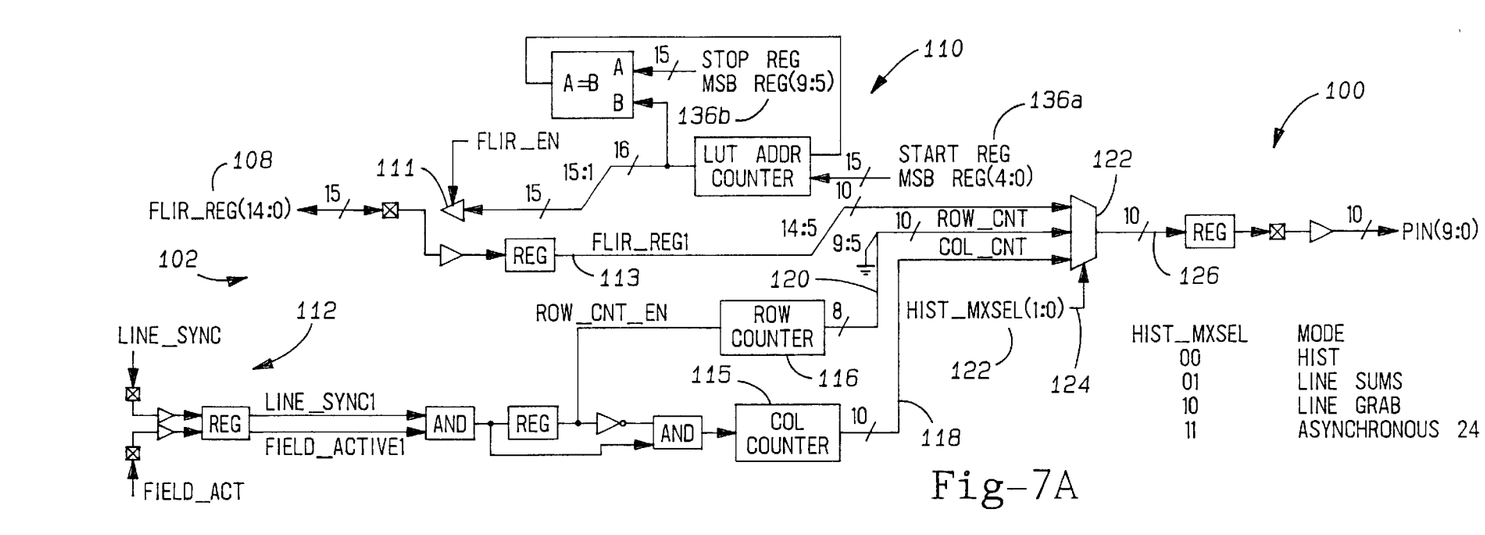
FIGS. 7A–7B are schematic block diagrams of the high speed hardware loader according to a preferred embodiment of the present invention as implemented in the field programmable gate array shown in FIG. 6.
Figure 7B:
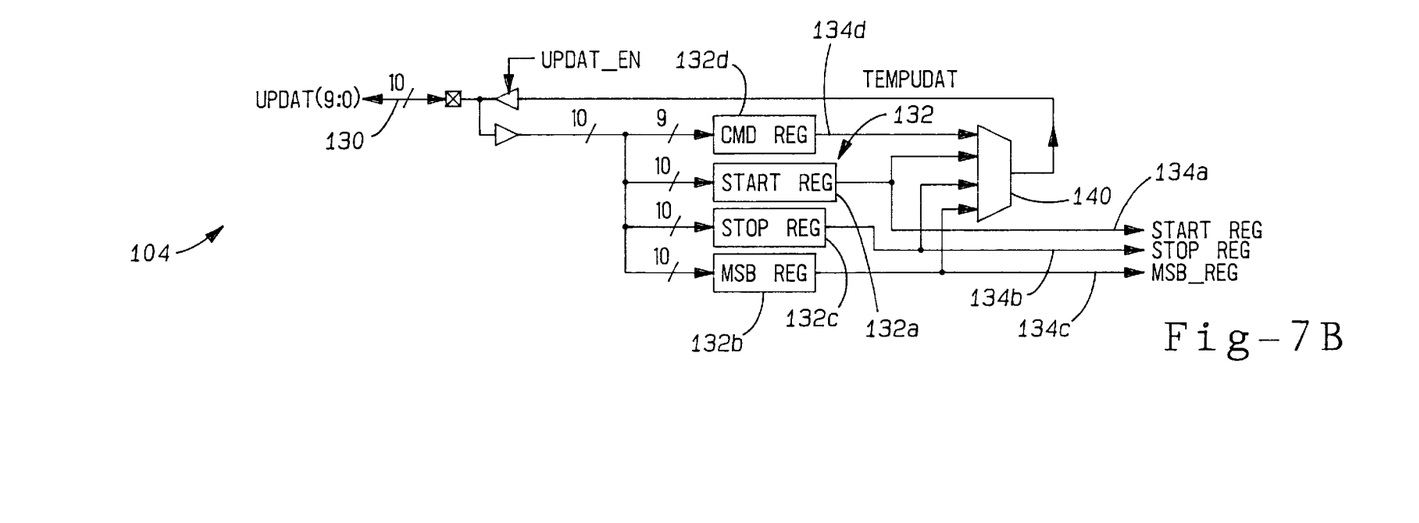

Referring to FIGS. 7A–7B, a schematic block diagram of the field programmable gate array (FPGA) shown in FIG. 6 is shown generally at 100. The FPGA 100 includes two main subarrays: a counter subarray 102 and a microprocessor/FPGA command subarray 104.

Referring to the counter subarray 102, video input line 108 inputs the fifteen bit video input signal from the saturation detector 64. A look-up table counter loop 110 is implemented for loading data into the LUT, as will be described below. The output of the LUT counter loop 110 is multiplexed with the FLIR video input signal at multiplexer 111 and output on line 113.

In addition, line sync and field active lines, indicated generally at 112, are input from the system timing generator (FIG. 6). In particular, the input lines 112 control operation of a column counter 115 and a row counter 116. The column and row counters 115, 116 are selectively enabled to the histogram 80. Both provide information to control loading of video signal data into each row and column of the LUT for data compression purposes. The row counter increments by 1 from 0–239 as each line of video signal data is loaded into the LUT, and resets every data load line. The column counter increments by 1 at every reset of the row counter 116. The column counter signal is output on line 118, while the row counter signal is output on line 120. The output lines 118, 120 are then input into a multiplexer 122, along with the multiplexed video data input signal line 113. When activity ceases at the detector array, i.e., when the detector array does not detect energy from a target scene, the input lines 112 relay this information to the counters 115, 116, and the counters are reset.

The look-up table address counter loop 110, the column counter 115 and the row counter 116 outputs are multiplexed together at the multiplexer 122. A histogram MUX select line, indicated at 124, inputs a histogram mode control signal from the microprocessor 82 into the multiplexer to control the histogram mode control signal output on line 126. Table 1 below indicates the various histogram MUX select command inputs and the corresponding output command signal output at 126:

| Histogram MUX Select | Mode |
|---|---|
| 00 | Histogram Function |
| 01 | Line Sum Function |
| 10 | Line Grab Function |
| 11 | Asynchronous 24 Function |

Upon receiving a 00 signal from the processor 82, the multiplexer 122 outputs a HISTOGRAM command signal on line 126 that switches the histogram chip 80 into a line summing, or accumulation mode. The histogram chip, when in a histogramming mode, generates a histogram of the video signal data, for use by the processor in differentiating between useful video data and discardable video signal data in data compression applications.

Upon receiving a 01 signal from the processor 82, the multiplexer 122 outputs a LINE SUM command signal on line 126 to the histogram that switches the histogram 80 into a line summing, or accumulation, mode. The histogram, when operating in a line summing mode, utilizes data from the row counter 116 for applications in conjunction with the processor, such as correction of non-uniformities in each of the 240 TDI channels output from the detector array 26.

Upon receiving a 10 signal from the processor, the multiplexer 122 outputs a LINE GRAB command signal on line 126 that switches the histogram into a line grabbing mode. The histogram, when operating in a line grabbing mode, utilizes data from both the column counter 115 and the video input signal in conjunction with the processor for performing functions such as pixel alignment applications to enhance output video signal quality.

Upon receiving a 11 signal from the processor 82, the multiplexer 122 outputs a PROCESSOR READ command to the histogram chip, subsequently switching the histogram chip into a mode in which data accumulated by the histogram is read by the processor and used for one of the above mentioned applications.

The FPGA/microprocessor subarray 104 is coupled to the data bus of the microprocessor at line 130. Through the line 130, the microprocessor inputs START, STOP and MOST SIGNIFICANT BIT data load functions to control loading of data into the look-up table 74 through the registers 132a–132c. Register outputs 134a–134c are coupled to the look-up table address counter loop 111 as indicated in the counter subarray 102 at 136a and 136b. In addition, the subarray 104 includes a command register 132d having an input coupled to the input line 130 and an output line 134d that is input, along with the outputs 134a–134c, into a multiplexer 140 for processor read capability. The command register 132d functions as an input/output port and functions to initialize the histogram 80 in whatever mode is input on the histogram MUX select line 124. The registers 134a–134d effectively enable the processor to issue commands to the FPGA to load a piece of data into the rows and columns in the LUT 74.

The most significant bit register 132c is implemented based on the assumption that the seven most significant bits of the START and STOP address registers are equal. The most significant bit register 132c enables the system to identify into which bank of memory within the LUT data is being loaded and enables this bank of memory only to be block loaded up to 1024 locations.

It should be appreciated at this point that the START and STOP address values each require fifteen bits to perform a look-up table right block function. The START address register preferably contains the ten least significant bits (LSBs) of the START address and the STOP address register preferably contains the ten LSBs of the STOP address. The MSB address register preferably contains the remaining five MSBs for the START and STOP address values.

Figure 8:
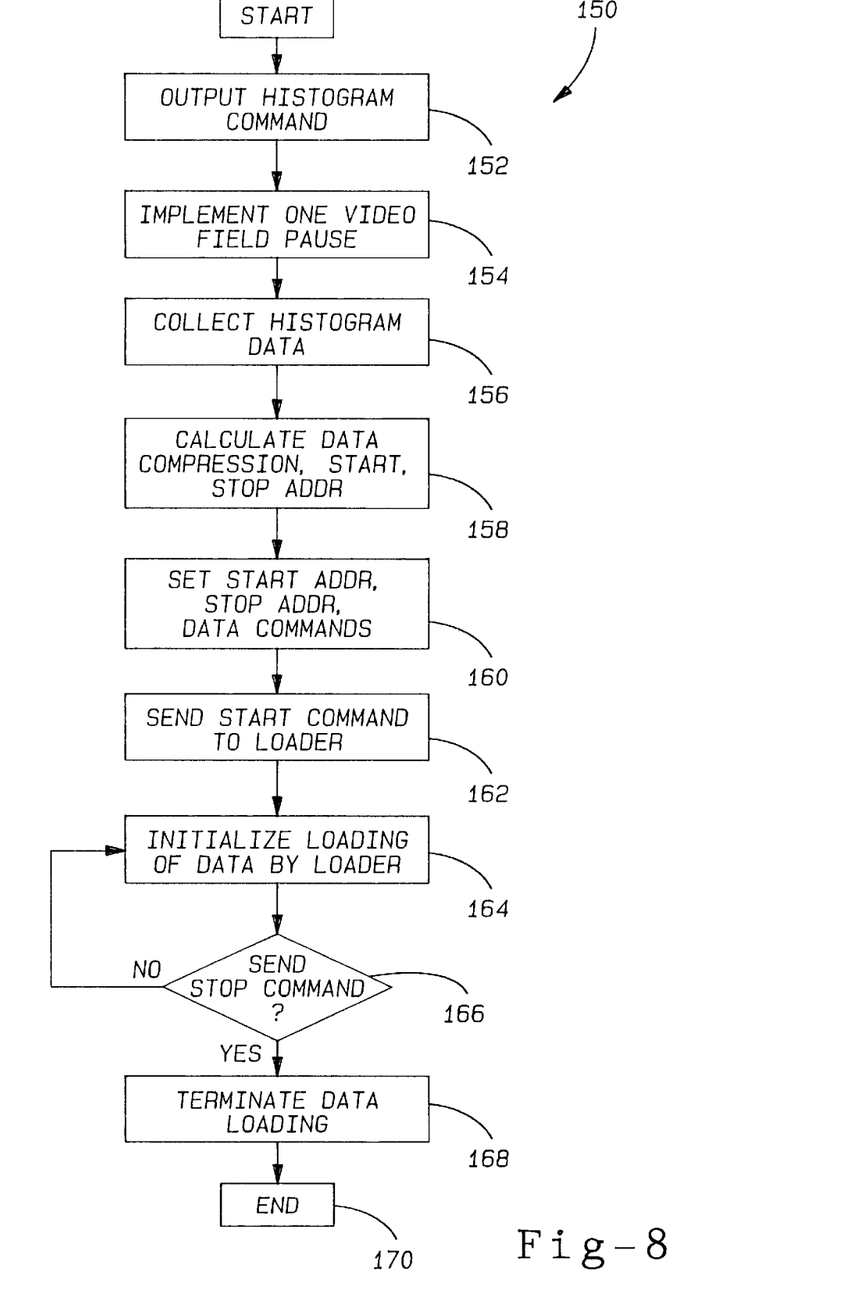
FIG. 8 is a flow diagram illustrating a preferred method of implementation of the high speed hardware loader according to the present invention.

Referring to FIG. 8, a preferred method of operation of the above described high speed hardware loader is shown at 150. At step 152, the processor outputs a HISTOGRAM command signal into the hardware loader 100 through the MUX select line 124 to the histogram chip as described above. At step 154, the processor implements a one video field pause at the histogram chip as the chip accumulates video signal data. At step 156, the processor collects histogram data accumulated by the histogram chip. At step 158, the processor calculates data compression, start addresses and stop addresses for each data output. At step 160, the processor sets up START ADDRESS, STOP ADDRESS and DATA commands. At step 162, the processor sends the START command to the hardware loader 100. Subsequent to receiving the START command, the processor initializes the high speed hardware loader of the present invention to begin loading of the video signal data into the LUT 74 on an address by address basis, as indicated at step 164. At step 166, the processor determines if a STOP command should been sent through STOP register 134b to terminate loading of video signal data in the LUT 74. If no STOP command is sent, the method returns to step 164, and the high speed hardware loader continues to load data into the LUT. If a STOP command is sent by the processor, the hardware loader terminates loading of data into the LUT, as indicated at step 168. The method subsequently ends with step 170 until the loaded data is output from the LUT and a new HISTOGRAM command is sent to the register 134a.

The high speed hardware loader 100 of the present invention thus eliminates the need of prior data compression system processors to load data address by address into the LUT. Rather, the processor need only execute START, STOP, and other hardware loader execution commands to the high speed hardware loader. The high speed hardware loader subsequently handles the address by address loading of the data into the LUT. The processor is thereby freed up for other applications. By loading video signal data through the FPGA to a look-up table, the overall data compression process is expedited, as system delays associated with the address by address loading of the data by the processor are minimized.

Various other advantages of the present invention will become apparent to those skilled in the art after having the benefit of studying the foregoing text and drawings, taken in conjunction with the following claims.

What is claimed is:

1. A data compression system for use in a thermal imaging unit, comprising:

a system processor;

a look-up table for receiving an input video signal and for providing a compressed video signal;

a hardware-based loader for loading said input video signal into said look-up table, said hardware loader initiating and terminating loading of said video signal data into said look-up table in response to commands from said system processor, said processor executing START and STOP commands to control loading of said input video signal to said look-up table by said hardware-based loader on an address-by-address basis; and a histogram chip for receiving said compressed video signal to provide compressed output video information in a format for use by said thermal imaging unit.

2. The data compression system of claim 1, wherein said look-up table compresses a fifteen bit video signal input into an eight bit video signal output.

3. A thermal imaging system, comprising;

a system processor;

means for receiving a thermal image to provide an input video signal;

a look-up table coupled to said receiving means for receiving said input video signal and for providing a compressed video signal;

a hardware-based loader coupled to said look-up table for loading said input video signal into said look-up-table, said hardware loader initiating and terminating loading of said video signal data into said look-up table in response to commands from said system processor, wherein said processor executes START and STOP commands to control loading of said input video signal data to said look-up table by said hardware-based loader on an address-by-address basis; and a histogram chip for receiving said compressed video signal to provide compressed output video information in a format for use by said thermal imaging system.

4. The thermal imaging system of claim 3, wherein said processor compresses a fifteen bit video signal input into said look-up table to an eight bit video signal output from said look-up table.

5. The thermal imaging system of claim 3, wherein said hardware-based loader comprises a field programmable gate array including command, START, STOP, and MOST SIGNIFICANT BIT registers responsive to said system processor commands.

6. A data compression system for use in a thermal imaging unit, comprising:

a system processor;

a look-up table for receiving an input video signal and for providing a compressed video signal;

a hardware-based loader for loading said input video signal into said look-up table, said hardware loader initiating and terminating loading of said video signal data into said look-up table in response to commands from said system processor, said hardware based loader comprising a field programmable gate array including command, START, STOP and MOST SIGNIFICANT BIT registers responsive to said system processor commands; and a histogram chip for receiving said compressed video signal to provide compressed output video information in a format for use by said thermal imaging unit.

7. A data compression system for use in a thermal imaging unit, comprising:

a system processor;

a look-up table for receiving an input video signal and for providing a compressed video signal;

a hardware-based loader for loading said input video signal into said look-up table, said hardware loader initiating and terminating loading of said video signal data into said look-up table in response to commands from said system processor, wherein said hardware based loader comprises a look-up table address counter, a row counter and a column counter for accumulating data for said histogram chip for different modes of operation of said histogram chip; and a histogram chip for receiving said compressed video signal to provide compressed output video information in a format for use by said thermal imaging unit.

8. A data compression system for use in a thermal imaging unit, comprising:

a system processor;

a look-up table for receiving an input video signal and for providing a compressed video signal;

a hardware-based loader for loading said input video signal into said look-up table, said hardware loader initiating and terminating loading of said video signal data into said look-up table in response to commands from said system processor, wherein said hardware-based loader comprises a field programmable gate array; and a histogram chip for receiving said compressed video signal to provide compressed output video information in a format for use by said thermal imaging unit.

9. A thermal imaging system, comprising;

a system processor;

means for receiving a thermal image to provide an input video signal;

a look-up table coupled to said receiving means for receiving said input video signal and for providing a compressed video signal;

a hardware-based loader coupled to said look-up table for loading said input video signal into said look-up-table, said hardware loader initiating and terminating loading of said video signal data into said look-up table in response to commands from said system processor, wherein said address based loader comprises a field programmable array; and a histogram chip for receiving said compressed video signal to provide compressed output video information in a format for use by said thermal imaging system.

10. A thermal imaging system, comprising;

a system processor;

means for receiving a thermal image to provide an input video signal;

a look-up table coupled to said receiving means for receiving said input video signal and for providing a compressed video signal;

a hardware-based loader coupled to said look-up table for loading said input video signal into said look-up-table, said hardware loader initiating and terminating loading of said video signal data into said look-up table in response to commands from said system processor; and a histogram chip for receiving said compressed video signal to provide compressed output video information in a format for use by said thermal imaging system, wherein said hardware-based loader comprises a look-up table address counter, a row counter and a column counter for accumulating data for said histogram chip for different modes of operation of said histogram chip.

* * * * *